(12) United States Patent
Ringland et al.

(10) Patent No.: US 10,772,129 B2
(45) Date of Patent: Sep. 8, 2020

(54) METHOD AND APPARATUSES FOR CONTROLLING COMMUNICATIONS DEPENDING ON DETECTED RADAR SIGNALS

(71) Applicant: British Telecommunications Public Limited Company, London (GB)

(72) Inventors: Simon Ringland, London (GB); Francis Scahill, London (GB)

(73) Assignee: British Telecommuncations Public Limited Company, London (GB)

( * ) Notice: Subject to any disclaimer, the term of this patent is extended or adjusted under 35 U.S.C. 154(b) by 0 days.

(21) Appl. No.: 16/485,047

(22) PCT Filed: Feb. 5, 2018

(86) PCT No.: PCT/EP2018/052768
§ 371 (c)(1),
(2) Date: Aug. 9, 2019

(87) PCT Pub. No.: WO2018/146038
PCT Pub. Date: Aug. 16, 2018

(65) Prior Publication Data
US 2019/0364598 A1 Nov. 28, 2019

(30) Foreign Application Priority Data
Feb. 10, 2017 (EP) .................... 17155641

(51) Int. Cl.
*H04W 74/08* (2009.01)
*H04W 16/14* (2009.01)
*H04W 92/20* (2009.01)

(52) U.S. Cl.
CPC ....... *H04W 74/0816* (2013.01); *H04W 16/14* (2013.01); *H04W 92/20* (2013.01)

(58) Field of Classification Search
CPC . H04W 92/20; H04W 74/0816; H04W 88/08; H04W 16/14; H04W 74/08;
(Continued)

(56) References Cited

U.S. PATENT DOCUMENTS

| | | | | |
|---|---|---|---|---|
| 7,400,612 | B2* | 7/2008 | Yamaura | H04B 1/401 370/338 |
| 7,606,193 | B2* | 10/2009 | McFarland | H04W 72/02 342/159 |

(Continued)

FOREIGN PATENT DOCUMENTS

| | | |
|---|---|---|
| CN | 105307186 A | 2/2016 |
| EP | 1 562 333 A2 | 8/2005 |

(Continued)

OTHER PUBLICATIONS

ETSI DFS Testing Requirements Draft ETSI EN 301 893 V1.7.2, Broadband Radio Access Networks (BRAN); 5 GHz high performance RLAN; Harmonized EN covering the essential requirements of article 3.2 of the R&TTE Directive (95 pgs) (Jul. 2014).

(Continued)

*Primary Examiner* — Man U Phan
(74) *Attorney, Agent, or Firm* — Patterson Thuente Pedersen, P.A.

(57) ABSTRACT

Methods and apparatus are disclosed for controlling wireless communication between a first wireless access point and one or more user devices, the first access point having an interface for communication with the user devices on one or more wireless communication channels in a predetermined frequency range, and also being configured to communicate with one or more other wireless access points. The access points each have a radar detector operable to detect possible radar signals within the frequency range, and are configured to provide information indicative of whether or not possible radar signals have been detected. The first access point (Continued)

receives communications relating to information provided by the other access points, and starts or stops wireless communications with its user devices on a particular channel based on whether or not it has detected possible radar signals together with whether or not the other wireless access points have detected possible radar signals.

15 Claims, 4 Drawing Sheets

(58) Field of Classification Search
CPC ........ H04W 72/08; H04W 84/12; H04Q 7/00; H04Q 7/20; H04K 3/822; H04K 2203/18; H04K 3/226; H04L 12/413
USPC .................................................. 370/252, 330
See application file for complete search history.

(56) References Cited

U.S. PATENT DOCUMENTS

| | | | |
|---|---|---|---|
| 7,944,886 B2* | 5/2011 | Stephenson | H04W 16/14 370/331 |
| 8,116,688 B2* | 2/2012 | Matsumoto | H04W 16/14 455/63.1 |
| 9,119,079 B2* | 8/2015 | Soyak | H04K 3/226 |
| 9,622,089 B1* | 4/2017 | Ngo | H04W 16/14 |
| 9,736,845 B1* | 8/2017 | Yi | H04W 72/0453 |
| 10,070,445 B2* | 9/2018 | Sakamoto | H04W 16/14 |
| 10,362,549 B2* | 7/2019 | Luo | H04W 56/002 |
| 10,368,247 B2* | 7/2019 | Ngo | H04W 16/14 |
| 2006/0082489 A1* | 4/2006 | Liu | H04B 17/345 342/52 |
| 2010/0290414 A1 | 11/2010 | Yamada | |
| 2016/0198424 A1 | 7/2016 | Luo et al. | |
| 2016/0337868 A1* | 11/2016 | Kenney | H04W 72/0446 |
| 2017/0041954 A1 | 2/2017 | Tsai et al. | |
| 2018/0059213 A1* | 3/2018 | Wallstedt | G01S 7/021 |

FOREIGN PATENT DOCUMENTS

| | | |
|---|---|---|
| EP | 3 026 947 A1 | 6/2016 |
| WO | WO 2015/130336 A1 | 9/2015 |
| WO | WO 2016/159852 A1 | 10/2016 |
| WO | WO 2018/146038 A1 | 8/2018 |

OTHER PUBLICATIONS

Extended European Search Report for Application No. 17155641 8, dated Aug. 17, 2017 (9 pgs).
802.11h—2003: IEEE Standard for Information technology—Local and metropolitan area networks—Specific requirements—Part 11: Wireless LAN Medium Access Control (MAC) and Physical Layer (PHY) Specifications—Spectrum and Transmit Power Management Extensions in the 5 GHz Band in Europe, Amendment to ANSI/IEEE Std 802.11, 1999 Edition, (R2003) (3 pgs).
International Search Report and Written Opinion for Application No. PCT/EP2018/052768, dated May 17, 2018 (12 pgs).
PCT Direct/informal comments accompanying New International Patent Application Claiming Priority from European Patent Application EP 17 155 641.8 British Telecommunications public limited company (dated Feb. 5, 2018) (2 pgs).
United Kingdom Combined Search and Examination Report under Sections 17 and 18(3) for Application No. GB1702229.4, dated Jul. 7, 2017 (6 pgs).

* cited by examiner

| Time | Type of Radar | Pulse width (µs) | Number of different pulse repetition frequencies | Pulse repetition frequency (Hz) list | Number of Pulses per burst | Burst interval time (µs) | Peak pulse signal strength (dBm) | Confidence Level |
|---|---|---|---|---|---|---|---|---|
| 2016-01-12 14:50:52.123456 | ETSI Type 1 | 0.5 | 1 | 500 | 10 | N/A (only single burst detected) | -55 | 0.8 |
| 2016-01-12 14:50:52.123456 | N/A | | | | | | | 0 |

Table 1: Possible Output from a Radar Detection Interface

| Time | Type of Radar | Confidence Level | Changing Channel |
|---|---|---|---|
| 2016-01-12 14:50:52.123456 | ETSI Type 1 | 0.8 | true |

Table 2: Possible Information that may be Broadcast by an Access Point

Figure 4

METHOD AND APPARATUSES FOR CONTROLLING COMMUNICATIONS DEPENDING ON DETECTED RADAR SIGNALS

CROSS-REFERENCE TO RELATED APPLICATION

The present application is a National Phase entry of PCT Application No. PCT/EP2018/052768, filed Feb. 5, 2018, which claims priority from European Patent Application No. 17155641.8 filed Feb. 10, 2017, each of which is fully incorporated herein by reference.

TECHNICAL FIELD

The present disclosure relates to methods of and apparatus for controlling wireless communication. In particular, embodiments of the present disclosure relate to wireless access points and techniques by which wireless access points may perform "Dynamic Frequency Selection" or DFS.

BACKGROUND

In wireless networking, a wireless access point ("wireless AP" or "WAP") is a device used to generate a wireless local area network ("wireless LAN" or "WLAN") to allow a number of wireless client devices to communicate using radio transmissions within a small/local geographical area such as that of a home or office. It is common for wireless access points generating WLANs to operate in accordance with the IEEE 802.11 family of wireless protocols, more commonly known as WiFi or Wi-Fi™.

WLANs generally can have a range of tens of meters which is generally large enough to cover a home or small office. Despite the possible range, the exact coverage and data rates obtainable in a given location are dependent on the transmission power, frequency band of the WLAN and signal attenuation caused by the presence of obstructions and interference.

The transmission power is limited by licensing restrictions set by a radio regulator and also power constraints of the wireless devices themselves. The frequency is relevant because IEEE 802.11 operates in the 2.4 GHz and 5 GHz range of unlicensed radio spectrum. The 2.4 GHz frequency range used in IEEE 802.11b/g/n provides longer range than the 5 GHz frequency so suffers less from attenuation caused by obstructions, but WLANs operating in 2.4 GHz are more susceptible to interference from other 2.4 GHz WLANs as well as from other devices operating in the non-licensed spectrum range such as Bluetooth™ devices, cordless landline telephones and microwave ovens.

Within a WLAN band of frequencies, there are generally several channels, each channel covering a smaller range of frequencies. Each channel on the 2.4 GHz spectrum is 20 MHz wide. The entire spectrum is less than 100 MHz wide (in most of world it is only 83.5 MHz wide, including guard bands) and the centers of neighboring channels are separated by 5 MHz. This means that there is some overlap between most of the channels. Due to this and the possibility of interference from WLAN and other devices operating in the same spectrum range, many wireless access points allow for channel selection within a band (and some allow for band selection as well).

In contrast to the 2.4 GHz band, the 5 GHz band used in IEEE 802.11n/ac has a higher peak bandwidth and operates in a less congested range of spectrum with more available channels, but due to the shorter wavelengths, has a shorter range for a given transmission power and is more sensitive to attenuation caused by the presence of walls. In some applications, 5 GHz WiFi is recommended for short-range (i.e. based on the distance between the wireless access point and the user device), high-bandwidth uses such as video data streaming, while 2.4 GHz WiFi is recommended where coverage and range is more important.

Wireless access point devices operating according to IEEE 802.11n in the 2.4 GHz spectrum may provide at least 11 defined operating channels. Wireless access point devices operating according to IEEE 802.11n or IEEE 802.11ac and generating a WLAN in the 5 GHz spectrum may provide a greater number of operating channels, the number being different in different countries.

Some of the radio channels used by WiFi systems in the 5 GHz unlicensed band are shared with radar, however. Radar is the primary user (i.e. it has priority), so it is mandated that WiFi systems such as wireless access points must monitor for radar signals, and if they detect them, must stop using those channels. This process is known in the WiFi industry as "Dynamic Frequency Selection" or DFS.

To use a "DFS" channel, a WiFi access point must first perform a "Channel Availability Check" (CAC), during which it listens without transmitting for a period of time (generally 1 or 10 minutes depending on the channel) to determine whether radar signals are present or not. If the channel is clear, the access point can then use the channel, but it must perform ongoing "In Service Monitoring" (ISM) while using the channel. Performing ongoing ISM is technically more challenging than performing a CAC.

While there are regulatory requirements that must be satisfied during testing, relating in particular to the minimum successful detection rates for (simulated) real radar signals, there is no such requirement relating to the false detection rate.

Referring to prior art documents, an ETSI Draft document ETSI EN 301 893 V1.7.2 dated July 2014 and entitled "Broadband Radio Access Networks (BRAN); 5 GHz high performance RLAN; Harmonized EN covering the essential requirements of article 3.2 of the R&TTE Directive", available online at www.etsi.org, includes a section (Section 4.7) entitled "Dynamic Frequency Selection (DFS)" which sets out the DFS-related technical requirements and their applicability for various operational modes.

Table D.4 of the same ETSI Draft document, entitled "Parameters of radar test signals", outlines the characteristics of the signals used to simulate radar for DFS testing purposes.

CN105307186 ("Huawei") relates to a method for sending information, and refers to the problem that Wireless Local Area Network (WLAN) devices can take a long time to perform radar detection. The method involves an Access Point performing a Channel Availability Check for a first channel to determine whether a radar signal exists in that channel, and if so, sending a CAC result to a WLAN control device or another Access Point, the CAC result comprising the identifier of the first channel.

EP1562333 ("Sony") relates to wireless communication systems, apparatus and methods for implementing radar wave detection. In particular, it relates to systems, apparatus and methods for establishing communication among a plurality of wireless stations that constitute, for instance, a wireless LAN, and to wireless communication systems, apparatus and methods for allowing various communication stations to perform network operations in an autonomous distributed manner without using any specially installed control station. More specifically, it relates to systems, apparatus, methods and computer programs for sharing the same frequency band with a radar wave system by making a frequency change in response to a radar wave detection in an autonomous distributed communication environment, and for detecting radar waves and making frequency changes in an autonomous distributed network while considering the power consumption of each communication station.

US2010290414 ("Yamada") relates to a wireless communication device, system and method in which one of two access points, on detecting radar/radio signals, notifies the other access point of a change of a communication channel to a newly allocated channel, and actually changes the communication channel to the newly allocated channel.

EP3026947 ("NEC Corp") relates to a wireless LAN access point and to a wireless communication method that aims to prevent interference with a weather radar. An access point includes detection means detecting a radar signal; detection notification means notifying a different access point that the radar signal is detected; assessment means assessing whether or not the access point has authority to determine a channel to be used between the access points; determination means determining, when the access point has the authority, the channel to be used between the access points upon detection of a radar signal by the detection means or upon detection notification of a radar signal from the different access point; channel notification means notifying the different access point of the channel determined by the determination means; and change means changing a channel used with the different access point to the channel determined by the determination means or a channel notified from the different access point.

US2016198424 ("Luo et al") relates to a method and an apparatus for setting up an interface between access points.

IEEE Standard 802.11h, Amendment 5: "Spectrum and Transmit Power Management Extensions in the 5 GHz band in Europe" available online at www.ieeexplore.ieee.org specifies the extensions to IEEE 802.11™ for wireless LANs providing mechanisms for DFS and transmit power control (TPC) that may be used to satisfy regulatory requirements for operation in the 5 GHz band in Europe.

US2006082489 ("Liu et al") relates to a radar presence alert for a wireless LAN.

US2017041954 ("Tsai et al") relates to systems and methods for selecting available channels free of radar signals from a plurality of 5 GHz radio frequency channels.

WO15130336 ("Kenney et al") relates to access points and to a method for co-existence of WiFi and airborne radars in the 5 GHZ band.

WO16159852 ("Ericsson") relates to methods, arrangements and units for radar detection in a wireless communication system operating in a spectrum shared with a radar system.

SUMMARY

According to a first aspect of the disclosure, there is provided a method of controlling wireless communication between a first wireless access point and one or more user devices, the first wireless access point having a wireless communication interface for wireless communication with said one or more user devices using one or more wireless communication channels in a predetermined frequency range, the first wireless access point being configured to communicate with one or more other wireless access points, the first wireless access point and the one or more other wireless access points each having a radar detector operable to detect possible radar signals received by the access point within said predetermined frequency range and each being configured to provide information indicative of whether or not possible radar signals have been detected within said predetermined frequency range; the method comprising: said first wireless access point receiving communications relating to information provided by said one or more other wireless access points, and starting or stopping said wireless communication with said one or more user devices using a wireless communication channel in said predetermined frequency range in dependence on information indicative of whether or not possible radar signals have been detected within said predetermined frequency range by said first wireless access point and on information provided by said one or more other wireless access points indicative of whether or not possible radar signals have been detected within said predetermined frequency range by said one or more other wireless access points; wherein the starting or stopping of said wireless communication between said first wireless access point and said one or more user devices is in response to detection by said first wireless access point of one or more possible radar signals within said predetermined frequency range, said wireless communication being started or stopped in dependence on a detection threshold, said detection threshold itself being updated in dependence on said information provided by said one or more other wireless access points indicative of whether or not possible radar signals have been detected within said predetermined frequency range by said one or more other wireless access points.

Various different types of action may be taken by an access point (taking the role of the "first wireless access point") with decisions to start or stop wireless communication with the one or more user devices being taken in various different ways, examples of which are set out below.

According to some embodiments, the detection threshold may be lowered in response to information from one or more other wireless access points indicating that they have detected possible radar signals (i.e. essentially making the first access point more likely to react to a possible radar detection of its own), or may involve the detection threshold being raised in response to information from one or more other wireless access points indicating that they have not detected possible radar signals (i.e. essentially making the first access point less likely to react to a possible radar detection of its own).

According to some embodiments, the starting or stopping of said wireless communication between said first wireless access point and said one or more user devices may be in response to detection by said first wireless access point of one or more possible radar signals within said predetermined frequency range, said wireless communication being started or stopped in dependence on whether information is received indicating that at least one of said other wireless access points is also detecting one or more possible radar signals within said predetermined frequency range. This may allow the first access point to react to a possible radar detection of its own that may fall below its current detection threshold if it receives information that a possible detection of a radar signal with similar characteristics (e.g. its timing, pattern or precise frequency, for example) has been made by another access point, for example.

Alternatively or additionally, the starting or stopping of said wireless communication between said first wireless access point and said one or more user devices may be in response to receipt by said first wireless access point of a communication dependent on information having been provided by at least one other wireless access point indicative of whether or not said at least one other wireless access point has detected one or more possible radar signals within said predetermined frequency range.

According to some embodiments, the first wireless access point may be operable to communicate with said one or more user devices at different times using different wireless communication channels within a frequency band, the wireless communication channels each having a predetermined frequency range within the frequency band, the first wireless access point and one or more of the other wireless access points being operable to detect possible radar signals within said different wireless communication channels and being configured to provide information indicative thereof. In such embodiments, the first wireless access point may receive communications relating to information provided by said one or more other wireless access points in respect of said channels and select a wireless communication channel for communication with said one or more user devices in dependence on information indicative of one or more possible radar signals detected within said wireless communication channels by said first wireless access point and on information provided by said one or more other wireless access points indicative of one or more possible radar signals detected within said wireless communication channels by said one or more other wireless access points. The wireless access point may thus change to different channels within a band such as the 5 GHz band that is known to overlap with frequencies used for radar transmissions in order to use a channel that has been "cleared" for use by the access point (i.e. determined not to be a channel currently being used for radar transmissions within range of the access point).

Alternatively or additionally, the first wireless access point may be operable to communicate with said one or more user devices at different times using channels within different frequency bands, at least one of said bands including radar frequencies and at least one of said bands not including radar frequencies. In such embodiments, the first wireless access point may select a frequency band for communication with said one or more user devices in dependence on information indicative of one or more possible radar signals detected within said wireless communication channels by said first wireless access point and on information provided by said one or more other wireless access points indicative of one or more possible radar signals detected within said wireless communication channels by said one or more other wireless access points. The wireless access point may thus change to a channel in a different band such as the 2.4 GHz band known not to overlap with frequencies used for radar transmissions if unable to find a "cleared" channel within a band such as the 5 GHz band that does overlap with radar frequencies, for example.

According to some embodiments, the first wireless access point may be configured to communicate directly with said one or more other wireless access points. Such "direct" communication may involve wireless communication between the access points and/or communication via a wired network, without any control unit coordinating the communication between the access points.

Alternatively or additionally, the first wireless access point may be configured to communicate with said one or more other wireless access points via a control unit. In such cases, the control unit may be configured to forward information provided by other wireless access points to the first wireless access point, and/or may be configured to determine an instruction dependent on information provided by said other wireless access points and forwards an indication of said instruction to said first wireless access point.

Thus, the communications between the first access point and the one or more other access points, relating to information provided by the access points to each other indicative of whether or not detections of possible radar signals have been made, may be communicated (i.e. provided and/or received) directly (e.g. wirelessly, between near neighbors) or indirectly (e.g. via a control unit). The information received by the first access point (or by another access when acting as a "first access point") may be the actual information provided by one or more other access points indicative of whether or not they have detected possible radar signals, or may be instructions from a control unit that received and filtered or otherwise processed that information, having received it from the access points in question.

For a particular access point performing the functions of the "first wireless access point", the one or more "other wireless access points" with which the first wireless access point will be configured to communicate will generally be one or more neighboring or nearby wireless access points. This will generally be the case in embodiments where the information exchange between the respective access points involves wireless communication between them (e.g. via the same WiFi interface as each one uses for communicating wirelessly with the user devices within its own WLAN). This will generally be appropriate because access points located geographically close enough to each other to communicate with each other wirelessly are also likely to be close enough to each other to interact and possibly interfere with any radar source to a similar extent to each other. It will be appreciated however that the communication between the respective access points need not be wireless communication, and need not be limited to communication with immediate or near neighbors—as indicated above, it could involve communication via a control unit (e.g. via the Internet), in which case the control unit may itself use knowledge of the geographical locations of the respective access points to determine which are located sufficiently close enough to each other geographically that radar information detected by one should be provided to another or should affect instructions to be provided to another.

According to some embodiments, the information indicative of whether or not possible radar signals have been detected within said predetermined frequency range by a respective wireless access point (i.e. the first wireless access point and/or any other wireless access point) may comprise information characterizing each detection by the wireless access point in question of a possible radar signal within the predetermined frequency range or an indication that there have been no detections by the wireless access point in question of possible radar signals within the predetermined frequency range.

It will be noted that the respective access points are said to be operable to detect (using their radar detectors) and to provide to other access points information indicative of whether or not "possible radar signals" have been detected. It will be understood that it would also be correct to state that they are operable to detect and to provide information indicative simply of whether or not "radar signals" have been detected, but the term used is intended to emphasize that a particular access point need not "know" whether a signal it has detected is definitely a radar signal in order to provide potentially useful information indicative thereof to other access points.

In relation to the above, it will be noted that radar signals are generally typified by bursts of signal pulses, where the duration of a pulse is generally short, perhaps of the order of a microsecond. Multiple pulses generally form a burst, typically with one or two different fixed intervals between consecutive pulses in the burst. Alternatively with swept frequency radar systems, a longer pulse may be transmitted where the frequency is swept across a specified range of frequencies during the pulse. Signals detected by access points (using their radar detectors) having frequencies within a radar frequency range and conforming to any such pattern may be identified as possible radar signals, for example.

According to a second aspect of the disclosure, there is provided apparatus for controlling wireless communication between a first wireless access point and one or more user devices, the first wireless access point having a wireless communication interface for wireless communication with said one or more user devices using one or more wireless communication channels in a predetermined frequency range, the first wireless access point being configured to communicate with one or more other wireless access points, the first wireless access point and the one or more other wireless access points each having a radar detector operable to detect possible radar signals received by the access point within said predetermined frequency range and each being configured to provide information indicative of whether or not possible radar signals have been detected within said predetermined frequency range; the apparatus comprising: a receiver configured to receive communications relating to information provided by said one or more other wireless access points; and a processor configured to start or stop said wireless communication with said one or more user devices using a wireless communication channel in said predetermined frequency range in dependence on information indicative of whether or not possible radar signals have been detected within said predetermined frequency range by said first wireless access point and on information provided by said one or more other wireless access points indicative of whether or not possible radar signals have been detected within said predetermined frequency range by said one or more other wireless access points; wherein the processor is configured to start or stop said wireless communication between said first wireless access point and said one or more user devices in response to detection by said first wireless access point of one or more possible radar signals within said predetermined frequency range, said wireless communication being started or stopped in dependence on a detection threshold, said detection threshold itself being updated in dependence on said information provided by said one or more other wireless access points indicative of whether or not possible radar signals have been detected within said predetermined frequency range by said one or more other wireless access points.

According to a third aspect of the disclosure, there is provided a first wireless access point comprising a wireless communication interface for wireless communication with one or more user devices using one or more wireless communication channels in a predetermined frequency range, the first wireless access point being configured to communicate with one or more other wireless access points, the first wireless access point having a radar detector operable to detect possible radar signals received by the first access point within said predetermined frequency range and being configured to provide information indicative of whether or not possible radar signals have been detected within said predetermined frequency range, the first wireless access point further comprising apparatus according to the second aspect.

According to a fourth aspect of the disclosure, there is provided a computer program element comprising computer program code to, when loaded into a computer system and executed thereon, cause the computer to perform the method according to the first aspect.

The various options and embodiments referred to above in relation to the first aspect are also applicable in relation to the second, third and fourth aspects.

Some embodiments are able to reduce the false radar detection rate and to improve the true radar detection rate of a wireless access point when performing "In Service Monitoring" (ISM) and when performing "Channel Availability Checks" (CACs).

In particular, as well as allowing an access point to avoid initiating wireless communications on a particular channel (or to close down wireless communications on that channel if they have previously been initiated) purely due to its own detection information (i.e. in the light of predetermined thresholds) and allowing it to avoid initiating (or to close down) wireless communications on a particular channel in dependence purely on detection information received from another access point, preferred embodiments enable control of wireless communications between a wireless access point and one or more user devices in such a way that, when determining whether to initiate or close down communications on a particular channel, an access point's determination may be made in dependence on:

- its own detection information, used in conjunction with a threshold that itself may be updated at least partly in dependence on detection information received from one or more other access points; and/or
- detection information received from one or more other access points, used in conjunction with a threshold that itself may be updated at least partly in dependence on its own detection information.

Some embodiments allow information to be shared between wireless access points which may have detected radar, and for decisions to be taken based on the combination of an access point's own radar detection information and that of one or more other access points. Combining information from multiple neighboring or nearby access points can improve the reliability of the decision-making of (or in respect of) each, allowing each to improve its reliability of detection (and reaction to detection) of radar signals, to decrease its false detection rate of (and rate of unnecessary reaction to detection of) radar, and to improve its WiFi channel selection decisions.

BRIEF DESCRIPTION OF THE DRAWINGS

Embodiments of the present disclosure will now be described with reference to the appended drawings, in which:

FIG. 4 shows an example indicative of the possible output from a Radar Detection Interface of a wireless access point and an example indicative of the possible information that may be broadcast by a wireless access point.

DETAILED DESCRIPTION

Figure 1:
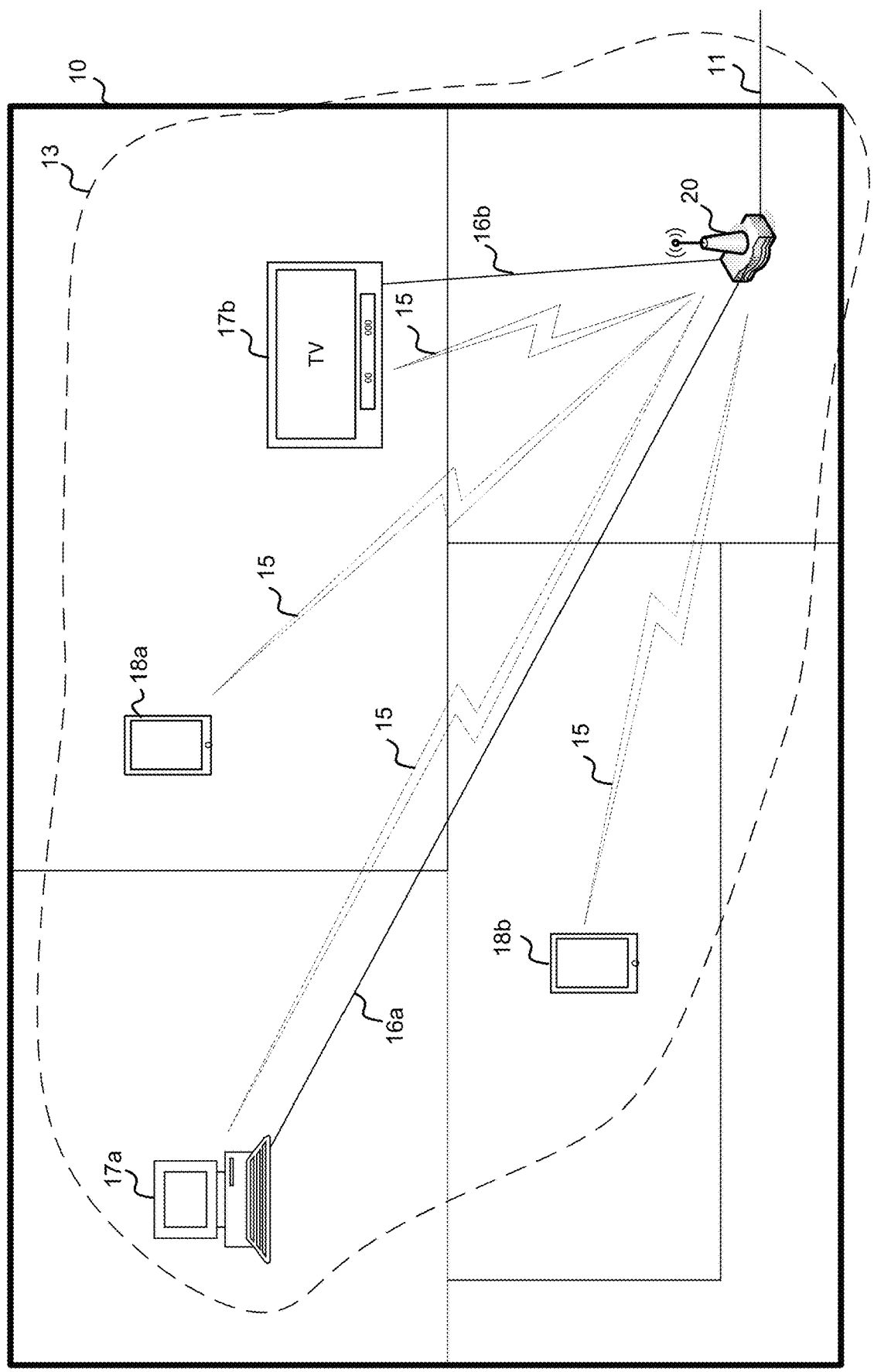
FIG. 1 shows an overview of a home broadband setup.

With reference to the accompanying figures, methods and apparatus according to embodiments will be described.

First of all, an example of a user premises including a wireless access point device will be described with reference to FIG. 1, which shows an overview of a user premises having a Wireless Local Area Network system.

Within a user premises 10 such a user's home or an office environment, a Wireless Local Area Network (WLAN) 13 is provided by a Wireless Access Point (WAP), which is generally provided as a part of a combined device also providing the functions of a modem and a router. Such a device may be referred to as a "home hub" or "hub", or as a "gateway device", but will generally be referred to here as wireless access point device 20.

The functional modules of an exemplary wireless access point device will be described in more detail later with reference to FIG. 2, but its normal functionality as a wireless access point device functioning in a user premises will be explained briefly here.

A modem section of the wireless access point device 20 connects to an Internet Service Provider or "ISP" (not shown) via a data link 11. The ISP manages a connection to a Wide Area Network (WAN) such as the Internet (not shown). Various technologies can be used to provide the data link to the ISP—the modem part of the wireless access point device 20 may be a Digital Subscriber Line (DSL) modem, for example. A WAP section has at least one wireless (WLAN) interface (an antenna) for communicating wirelessly with user devices in the WLAN. The wireless access point device 20 may also have one or more wired (e.g. Ethernet) interfaces for wired connections to devices with the premises.

A routing section of the wireless access point device 20 routes data between its various interfaces, for example between the one or more WLAN interfaces and an interface of the modem section, allowing wireless devices within the WLAN to communicate with external resources on the Internet.

The wireless access point device 20 is responsible for providing wireless networking connectivity to a number of wireless client devices 17, 18 having wireless interfaces, provided that the devices are located within (or near) the user premises 10. Some of the wireless client devices 17 will typically have a fixed location within the user premises due to their size, for example desktop computer 17a and smart appliances such as television 17b. Such devices may also have a wired (e.g. Ethernet) connection to a wired (e.g. Ethernet) interface of the gateway device 20. Wired connections to computer 17a and smart television 17b are indicated as lines 16a and 16b respectively.

Increasingly, users (or visitors to user premises) generally also have one or more mobile client devices 18a, 18b (generally, 18) which are portable enough to be moved easily around the user premises (as well as away from it). Examples of such devices include smartphones, tablets, small laptops, etc. Such devices generally do not have a fixed location or a fixed wired connection, instead communicating wirelessly with the wireless access point device 20 (and possibly with each other and/or with other devices as well). Their communication with wireless access point device 20 is indicated by dotted connection symbols 15. Unlike lines 16a and 16b referred to above, these wireless connection symbols are dotted and are given a communal number 15 because they are not separate physical communication entities.

The wireless access point device 20 generates the WLAN 13 which is generally a wireless private network, shown in FIG. 1 as having a range which should generally extend throughout the user premises 10 so that all client devices can communicate with the wireless access point device (and possibly with each other and/or with other devices).

In general, wireless access point devices generate a WLAN 13 in accordance with at least one of the IEEE 802.11 family of wireless protocols more commonly referred to as WiFi. As explained earlier, many wireless access point devices create a WLAN according to IEEE 802.11n, which provides for WLANs operating in either the 2.4 GHz spectrum or the 5 GHz spectrum. In this instance, we will consider the case of a wireless access point device creating a WLAN in the 5 GHz spectrum, however.

In either case, the private WLAN has a network name such as "Home WLAN" defined as a Service Set Identifier (SSID), and generally also has one or more authentication passwords so that only authorized devices are able to connect successfully to the WLAN.

The client devices 17, 18 supporting the same wireless protocol as the wireless access point device 20 and having credentials for the WLAN 13 can connect to the WLAN 13 at a connection speed which varies according to distance from the wireless access point device 20 and the presence of interference or attenuation.

Figure 2:
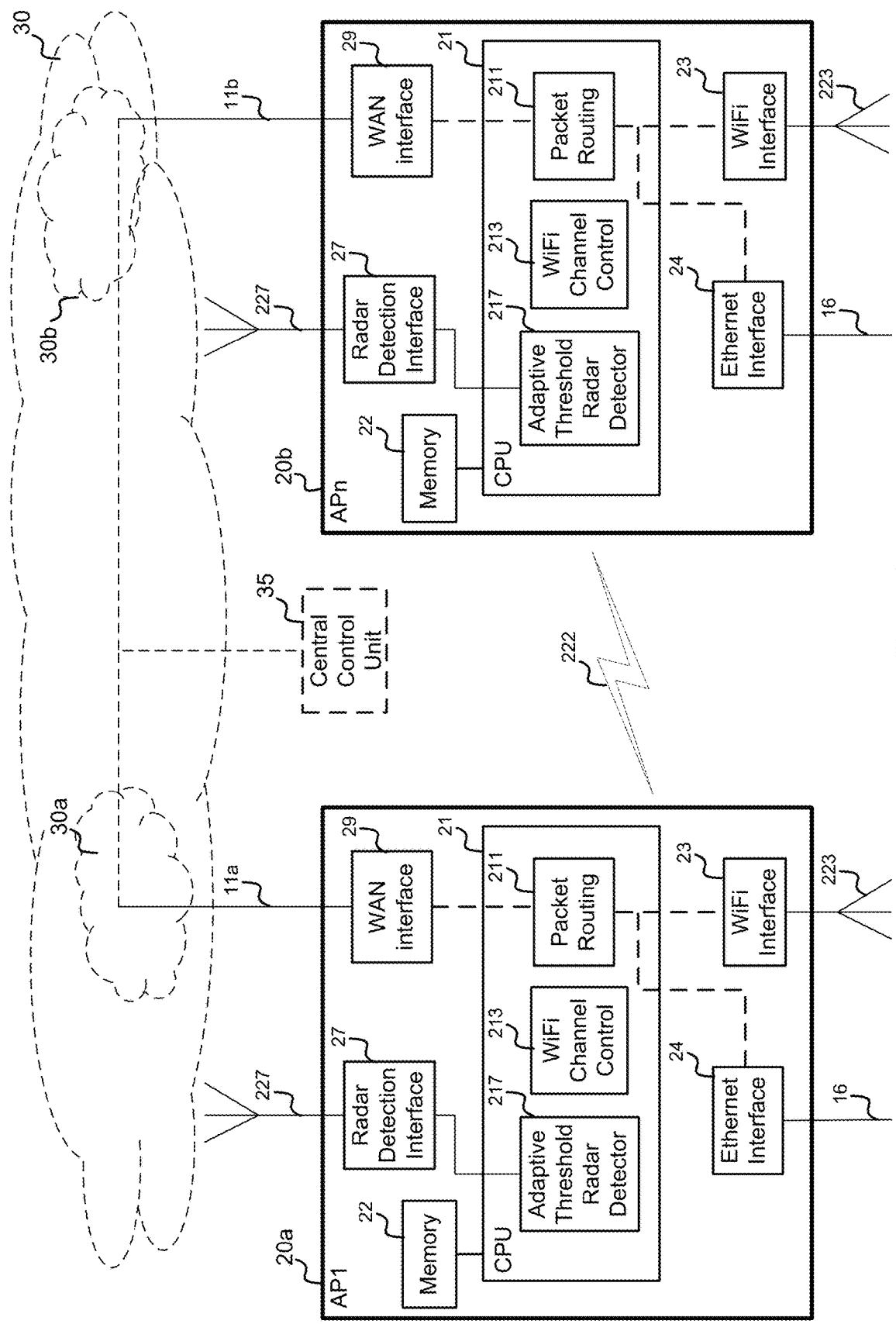
FIG. 2 shows a pair of neighboring/nearby wireless access points, and illustrates some of the functional modules within them.

Referring now to FIG. 2, this shows two wireless access point devices, namely device AP1, 20a and device APn, 20b (generally, "access points 20"). It will be noted that while only two access point devices are shown in FIG. 2, methods according to some embodiments may involve communications between several such access point devices, with any or all of the devices acting as the receiver of information from or provider of information to any or all of a number of other devices. A method by which one of these devices (e.g. device AP1, 20a) may communicate with another device (e.g. APn, 20b) and/or with one or more other such devices while performing a method according to one embodiment will be described in more detail later, with reference also to FIG. 3. Firstly, however, the primary functional modules of a wireless access point device that may be involved in the performance of a method according to a preferred embodiment will briefly be described.

According to one embodiment, a wireless access point device 20 (of which devices 20a and 20b are examples) contains a central processing unit (CPU) 21 and a memory 22 for internal processing and other functions. For external connectivity, each access point device 20 has a WiFi or wireless interface 23 (communicating via an antenna 223) and a wired Ethernet interface 24 for communication with user devices within the home or local network 13 (as described with reference to FIG. 1, for example), and a Wide Area Network (WAN) interface 29 for communication with devices outside the home or local network 13 such as servers, other access point devices and user devices in other local networks, generally via a connection 11 as shown in FIG. 1, such as data link 11a for device 20a (or data link 11b for device 20b) to an ISP network 30a (or ISP network 30b for device 20b), which may form part of a larger network such as the internet (indicated by the cloud symbol 30). The WAN interface 29 may include a Digital Subscriber Line (DSL) modem according to any of a variety of DSL technologies (referred to generally as "xDSL"), such as an Asymmetric Digital Subscriber Line (ADSL) modem or a Very-high-bit-rate Digital Subscriber Line (VDSL) modem, or may use a technology other than xDSL.

An access point device 20 may also communicate with other neighboring or nearby access point devices wirelessly, either via the same wireless interface 23 as is used for wireless communication with local user devices with its WLAN or via a different wireless interface (not shown). Such wireless communication between neighboring or nearby access point devices is symbolized by symbol 222.

In this example, each wireless access point device 20 also has a radar detection interface 27 (the functionality of which will be discussed in more detail later), comprising an antenna 227. It will be noted that some access points may have a single wireless interface providing the functionality of the WiFi interface 23 and that of the radar detection interface 27, the interface comprising a single antenna providing the functionality of the WiFi interface antenna 223 and that of the radar detection interface antenna 227.

In order to perform its processing, the memory 22 contains computer program instructions which are executable by the CPU 21 to define a number of functional software units. When these instructions are being executed, the access point device 20 can be regarded as containing a number of functional units for collecting and processing data. These functional components of the access point device 20, which are shown as modules within the CPU 21 but may alternatively be separate from it, include the following:
- a packet routing function 211 which routes data (generally in the form of packets) between the different interfaces, generally in accordance with header or other packet information;
- a WiFi channel control function 213; and
- an adaptive threshold radar detector 217.

The functionality of the WiFi channel control function 213 and the adaptive threshold radar detector 217 will be discussed in more detail later.

A central control unit 35, which may be in communication with the access point devices 20 via wireless communication (via their WiFi interfaces 23 or otherwise) and/or via a network such as the internet (via their WAN interfaces 29 or otherwise), may be involved in some embodiments, is also shown. The functionality of this will be discussed later.

A method by which a particular access point device 20 may operate according to one embodiment will be explained in detail with reference to FIG. 3. Such a method may be performed by any of a number of access points (e.g. device AP1, 20a), and may involve interactions with any of a number of access points (e.g. device APn, 20b).

Figure 3:
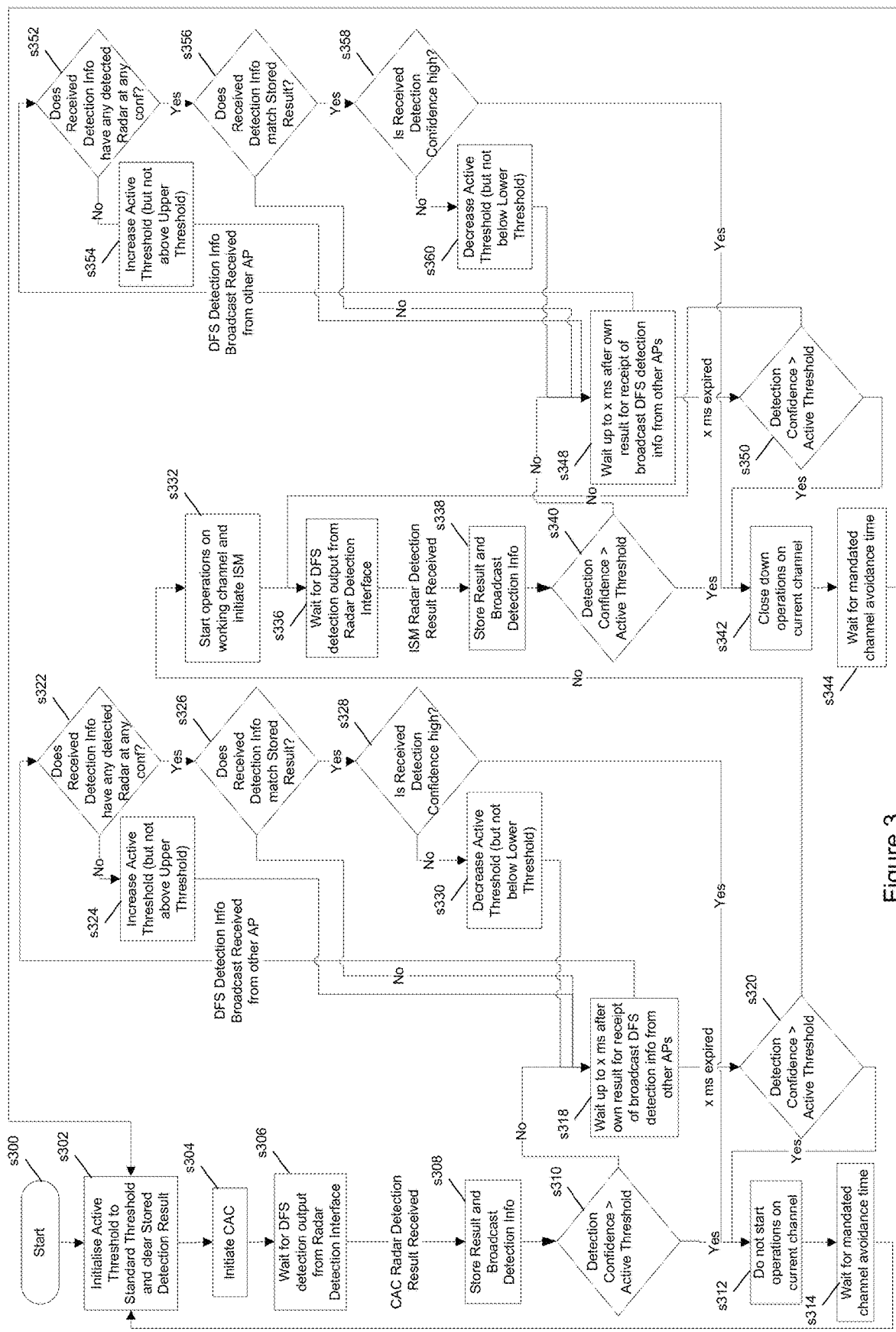
FIG. 3 is a flow-chart illustrating a method according to one embodiment.

Before discussing the specific steps shown in FIG. 3, however, the following overview of the process will be provided.

1) According to some embodiments, the WiFi access points concerned (e.g. AP1 to APn) each implement Channel Availability Checks (CACs) and In-Service Monitoring (ISM) with a variable active threshold which varies (in this example) between three fixed thresholds (referred to here as "upper", "standard" and "lower") which are compared to a confidence level for a particular match between an incoming signal and known radar patterns. The active threshold is initially set to the "standard" threshold.

2) When a particular access point detects a possible radar signal that is above its "lower" threshold, it broadcasts the information regarding the possible detection, noting the time, the pattern and the strength of the detected signal and/or detection confidence. The "first" access point (i.e. the access point which has detected the possible radar signal) may also include an indication to other access points as to whether it is closing down operations on the channel in question itself. If no radar signals are detected, the first access point may broadcast that no potential detections have been made (or may omit an element from a standard broadcast that would contain detection information if radar signals had been detected, for example). In this respect, each access point may act in the same manner, potentially acting as a "first" (or "information-providing") access point if it detects a possible radar signal.

Such information exchange between WiFi access points may involve wireless communication between them, via the same WiFi interface as is used for communicating wirelessly with user devices within the respective WLANs. This may be appropriate because WiFi access points located geographically close enough to each other to communicate with each other wirelessly are likely to be close enough to each other to interact and possibly interfere with any radar source to a similar extent to each other. (It will be noted that such information exchange between WiFi access points may involve broadcasts in "beacon" or "action frame" mode, for example, where "beacon" mode refers to regular bursts of information broadcast (every 100 ms, for example), and where "action frame" mode refers to other information not sent in "beacon" broadcasts. Action frames are generally sent in unicast mode to a specific recipient, rather than broadcast.)

Alternatively or additionally, WiFi access points may exchange such information with each other indirectly, each communicating (via their respective WAN interfaces and/or otherwise via the Internet, for example) with a server and/or central control unit (such as central control unit 35 shown in FIG. 2), which correlates information received from the respective WiFi access points and passes information and/or instructions back to WiFi access points where appropriate. The server and/or central control unit may perform this function in dependence on pre-stored or received information about the respective geographical locations of the WiFi access points, allowing it to pass information and/or instructions to WiFi access points in respect of which that information and/or those instructions are likely to be of particular relevance (due to the similarity of their geographical locations, for example).

3) If an access point's detection confidence is above its current active threshold, it closes down communication on the channel concerned and resets all of its thresholds to their initial values. It may attempt communication using a different channel, performing the process in respect thereof if necessary, but would preferably have at least one other channel already "cleared" for communication.

4) As well as monitoring for possible radar signals itself and providing information to other access points, each access point also listens to its neighboring/nearby access points to receive their detection broadcast information.

5) An access point able to detect broadcasts from one or more neighboring/nearby access points (or receiving signals from them otherwise, via a central control unit, for example) performs the following in respect of each neighboring/nearby access point from which it is able to detect broadcasts:
  (a) If the received broadcast does not indicate that the other (i.e. neighboring/nearby) access point has detected radar, then the access point increases its own active detection threshold by a specified amount to make detection of radar less likely (i.e. decreasing the chance of false detection), but not above the upper threshold.

(b) If the received broadcast does indicate that the other (i.e. neighboring/nearby) access point has detected radar at any confidence level, then the access point compares the detection pattern with its own detection pattern (if there has been a local possible detection), and acts as follows:
  (i) If the two patterns match (e.g. within a specified tolerance, taking into account their relative timings) and the other (i.e. neighboring/nearby) access point had a high confidence level, then the access point classifies this as a "true detection" and starts the "channel close-down" process, resetting the active threshold to the "standard" threshold value.
  (ii) If the two patterns match (e.g. within a specified tolerance, taking into account their relative timings) and the other (i.e. neighboring/nearby) access point had a low confidence level, then the access point decreases its active detection threshold by a specified amount, but not below the "lower" detection threshold, in order to make detection of true signals more likely.
  (iii) If the two patterns do not match, the access point treats it is a "false detection", and leaves its active threshold unaltered.
6) Once all other (i.e. neighboring/nearby) access points' broadcasts have been evaluated, the access point's own detected signal is re-evaluated against its updated active threshold, and if the signal is above that active threshold, the access point initiates close-down on the channel in question.

By using such a process, it will be appreciated that an access point is not only able to prevent the initiation of communications on a particular channel (or to close down communications on that channel if they have previously been initiated) due to its own detection information (in the light of predetermined thresholds), but is also able to prevent the initiation of (or to close down) communications on a particular channel in dependence on detection information received from another access point.

Furthermore, when determining whether to initiate or close down communications on a particular channel, an access point's determination may be made in dependence on:
  its own detection information, used in conjunction with a threshold that itself may be updated at least partly in dependence on detection information received from one or more other access points; and/or
  detection information received from one or more other access points, used in conjunction with a threshold that itself may be updated at least partly in dependence on its own detection information.

Looking now at the detailed steps involved in one embodiment, the process as set out in FIG. 3 will be described primarily from the point of view of a "first" access point AP1, 20a, having one or more neighboring/nearby access points such as APn, 20b. Essentially, the left-hand side of the flow-chart (i.e. s300 to s330) relates primarily to the steps that an access point may perform in order to initialize and then to initiate and perform Channel Availability Checks (based on its own detection information and any detection information received from one or more other/neighboring access points) up to the point at which it may start communication operations on a particular working channel, and the right-hand side of the flow-chart (i.e. s332 to s360) relates primarily to the steps that the same access point may perform in order to start communication operations on a particular working channel and then to initiate and perform In-Service Monitoring (again based on its own detection information and any detection information received from one or more other/neighboring access points).

According to this embodiment, the WiFi access points 20 (e.g. device AP1, 20a and device APn, 20b in FIG. 2) each implement Channel Availability Checks (CACs) and In-Service Monitoring (ISM) with a variable active threshold which varies between (for example) three fixed thresholds (referred to here as "upper", "standard" and "lower") which are compared to a confidence level for the match between incoming signals and known radar patterns. Thus, referring to "first" access point AP1, 20a and starting from step s300, the active threshold of access point AP1, 20a is set initially (at s302) to the "standard" threshold, and a CAC is initiated at s304 (with similar actions happening at neighboring/nearby access points APn, 20b).

Each access point then waits (s306) for any Dynamic Frequency Selection (DFS) detection output from its Radar Detection Interface 27, which would indicate the possible detection of a radar signal.

If any signal is detected at access point AP1, 20a (i.e. anything above the lower threshold), the result is stored locally and information about it is broadcast to neighboring access points APn, 20b (s308).

An example indicative of the possible output from a Radar Detection Interface is shown as Table 1, shown in FIG. 4. The fields will vary depending on type of radar detected.

The information that may be broadcast by an access point may be the same as or contain the same fields as that provided as the output from the Radar Detection Interface, or may be updated, re-formatted, or otherwise different. As indicated earlier, it may include an indication of whether the access point sending the information is changing channel itself as a result of the detection it has made. An example indicative of the possible information that may be broadcast by an access point is shown as Table 2, shown in FIG. 4.

How the neighboring/nearby access points receiving such broadcasts treat the information received will correspond to how the first access point AP1, 20a treats information it receives from its (near) neighbors, and will be discussed later at s318.

If the detection confidence for the detected radar signal is greater than the current Active Threshold (s310), the process proceeds to s312, taking a decision not to start WiFi communication operations on the channel concerned. The access point must then wait for a mandated "channel avoidance time" (s314) before it can return to s302 and have another attempt at the checks required before WiFi communications are permitted on the channel in question.

If (at s310) the detection confidence for the detected radar signal is found not to be above the current Active Threshold, the process proceeds instead to s318, at which the first access point AP1, 20a waits for up to a predetermined amount of time (i.e. "x milliseconds") after its own result for possible receipt of broadcast DFS detection information from any of its neighboring/nearby access points APn, 20b.

If no such DFS information is received within the predetermined amount of time, the process proceeds to s320 and a further check is made as to whether the detection confidence is greater than the current Active Threshold (s320) (this may simply be a repeat of the test performed at s310, but the active threshold may have changed if the process has reached s318 after performing s322 to s330, and new information may have been received). If the detection confidence is (again) found to be greater than the current Active Threshold, the process proceeds to s312 (as if from s310), taking a decision not to start WiFi communication as before, waiting for the mandated "channel avoidance time" (s314), then returning to s302. If the detection confidence is not found to be greater than the current Active Threshold, the process proceeds to s332, starting operations on the channel in question and initiating "In Service Monitoring" (ISM), as will be discussed later. The channel can be added to a "Cleared Channels" list maintained by the access point.

If any such DFS information is received within the predetermined amount of time, the process proceeds to s322. This happens each time DFS information is received from another access point, resulting in the subsequent section of the flow chart being entered for each set of DFS information that is received from another access point.

At s322, a check is made as to whether the received detection information indicates radar having been detected at any confidence level. If not, the active threshold of the access point can be increased (albeit not above the "Upper Threshold") at s324, and the process returns to s318. If so, a check is made as to whether the received detection information matches any stored results (s326). If not, the process returns to s318. If so, a check is made as to whether the detection confidence in respect thereof is high (s328). If so, the process returns to s312 (i.e. taking a decision not to start WiFi communication on the channel in question as before, etc.) If not, the active threshold for the access point can be decreased (albeit not below the "Lower Threshold") at s330, and the process returns to s318.

If the process has proceeded successfully to s332, operations are started on the channel in question and "In Service Monitoring" (ISM) is initiated. The access point then waits for any DFS detection output from its radar detection Interface 27.

S336 to s360 correspond essentially to s306 to s330, but are performed for the purpose of In-Service Monitoring (ISM) rather than for the purpose of carrying out Channel Availability Checks (CACs), since they relate to processes performed by access points in respect of their in-use channel or channels, rather than channels which a device may need or wish to start to use. Given this, s336 to s360 will only be described briefly, in order to highlight where these steps differ from s306 to s330.

S336, s338 and s340 correspond to s306, s308 and s310 except that it is the detection of an ISM signal (rather than a CAC signal) above an access point's lower threshold that leads to the result being stored locally and information about being broadcast to neighboring/nearby access points at s338.

At s342, which is reached if the detection confidence for the detected radar signal is greater than the current Active Threshold, a decision is taken to close down WiFi communication operations on the current channel (rather than not to start WiFi communication operations on the channel concerned, as happens in s312). Similarly, however, the access point must then wait for a mandated "channel avoidance time" (s344) before it can return to s302 and attempt the steps of the CAC process required before WiFi communications are permitted on the channel in question.

S348 and s350 correspond to s318 and s320 except that they relate to processes performed by an access point for ISM purposes (rather than for CAC purposes) in respect of broadcast DFS detection info from other access points.

Similarly, s352, s354, s356, s358 and s360 correspond to s322, s324, s326, s328 and s350 except that they relate to processes performed by an access point for ISM purposes (rather than for CAC purposes) in respect of broadcast DFS detection info from other access points.

While a particular access point would generally only be performing the process shown on the right-hand side of FIG. 3 in respect of one currently in-use channel, it will be appreciated that the access point may be performing the process shown on the left-hand side of FIG. 3 in respect of more than one other (i.e. not currently in use) channel at a time, with the aim of having one or more other channels registered as "cleared for use" as soon as operations need to be shut down on the currently in-use channel. This may assist an access point in achieving "Zero Wait" DFS. Alternatively, in addition to performing processing cycles in respect of one (or possibly more than one) currently in-use channel, an access point may perform processing cycles in respect of a more than one channels that are not currently in use successively, or in response to received information relating to possible radar detections within their respective frequencies, for example.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of controlling wireless communication between a first wireless access point and one or more user devices, the first wireless access point having a wireless communication interface for wireless communication with the one or more user devices using one or more wireless communication channels in a predetermined frequency range, the first wireless access point being configured to communicate with one or more other wireless access points, the first wireless access point and the one or more other wireless access points each having a radar detector operable to detect possible radar signals received by the access point within the predetermined frequency range and each being configured to provide information indicative of whether or not possible radar signals have been detected within the predetermined frequency range, the method comprising:

the first wireless access point receiving communications relating to information provided by the one or more other wireless access points, and starting or stopping the wireless communication with the one or more user devices using a wireless communication channel in the predetermined frequency range in dependence on information indicative of whether or not possible radar signals have been detected within the predetermined frequency range by the first wireless access point and on information provided by the one or more other wireless access points indicative of whether or not possible radar signals have been detected within the predetermined frequency range by the one or more other wireless access points, wherein the starting or stopping of the wireless communication between the first wireless access point and the one or more user devices is in response to detection by the first wireless access point of one or more possible radar signals within the predetermined frequency range, the wireless communication being started or stopped in dependence on a detection threshold, the detection threshold itself being updated in dependence on the information provided by the one or more other wireless access points indicative of whether or not possible radar signals have been detected within the predetermined frequency range by the one or more other wireless access points.

2. The method according to claim 1, wherein the starting or stopping of the wireless communication between the first wireless access point and the one or more user devices is in response to detection by the first wireless access point of one or more possible radar signals within the predetermined frequency range, the wireless communication being started or stopped in dependence on whether information is received indicating that at least one of the other wireless access points is also detecting one or more possible radar signals within the predetermined frequency range.

3. The method according to claim 1, wherein the starting or stopping of the wireless communication between the first wireless access point and the one or more user devices is in response to receipt by the first wireless access point of a communication dependent on information having been provided by at least one other wireless access point indicative of whether or not the at least one other wireless access point has detected one or more possible radar signals within the predetermined frequency range.

4. The method according to claim 1, the first wireless access point being operable to communicate with the one or more user devices at different times using different wireless communication channels within a frequency band, the wireless communication channels each having a predetermined frequency range within the frequency band, the first wireless access point and one or more of the other wireless access points being operable to detect possible radar signals within the different wireless communication channels and being configured to provide information indicative thereof, the method further comprising the first wireless access point receiving communications relating to information provided by the one or more other wireless access points in respect of the channels and selecting a wireless communication channel for communication with the one or more user devices in dependence on information indicative of one or more possible radar signals detected within the wireless communication channels by the first wireless access point and on information provided by the one or more other wireless access points indicative of one or more possible radar signals detected within the wireless communication channels by the one or more other wireless access points.

5. The method according to claim 1, the first wireless access point being operable to communicate with the one or more user devices at different times using channels within different frequency bands, at least one of the bands including radar frequencies and at least one of the bands not including radar frequencies, the method further comprising the first wireless access point selecting a frequency band for communication with the one or more user devices in dependence on information indicative of one or more possible radar signals detected within the wireless communication channels by the first wireless access point and on information provided by the one or more other wireless access points indicative of one or more possible radar signals detected within the wireless communication channels by the one or more other wireless access points.

6. The method according to claim 1, the first wireless access point being configured to communicate directly with the one or more other wireless access points.

7. The method according to claim 1, the first wireless access point being configured to communicate with the one or more other wireless access points via a control unit.

8. The method according to claim 7, the control unit being configured to forward information provided by other wireless access points to the first wireless access point.

9. The method according to claim 7, the control unit being configured to determine an instruction dependent on information provided by the other wireless access points and forwards an indication of the instruction to the first wireless access point.

10. The method according to claim 1, the radar detector being operable to detect possible radar signals received via the wireless communication interface of the access point.

11. The method according to claim 1, the radar detector being operable to detect possible radar signals received via a radar detection interface of the access point.

12. The method according to claim 1, wherein the information indicative of whether or not possible radar signals have been detected within the predetermined frequency range by a respective wireless access point comprises information characterizing each detection by the wireless access point of a possible radar signal within the predetermined frequency range or an indication that there have been no detections by the wireless access point of possible radar signals within the predetermined frequency range.

13. An apparatus for controlling wireless communication between a first wireless access point and one or more user devices, the first wireless access point having a wireless communication interface for wireless communication with the one or more user devices using one or more wireless communication channels in a predetermined frequency range, the first wireless access point being configured to communicate with one or more other wireless access points, the first wireless access point and the one or more other wireless access points each having a radar detector operable to detect possible radar signals received by the access point within the predetermined frequency range and each being configured to provide information indicative of whether or not possible radar signals have been detected within the predetermined frequency range, the apparatus comprising:

a receiver configured to receive communications relating to information provided by the one or more other wireless access points; and a processor configured to start or stop the wireless communication with the one or more user devices using a wireless communication channel in the predetermined frequency range in dependence on information indicative of whether or not possible radar signals have been detected within the predetermined frequency range by the first wireless access point and on information provided by the one or more other wireless access points indicative of whether or not possible radar signals have been detected within the predetermined frequency range by the one or more other wireless access points, wherein the processor is configured to start or stop the wireless communication between the first wireless access point and the one or more user devices in response to detection by the first wireless access point of one or more possible radar signals within the predetermined frequency range, the wireless communication being started or stopped in dependence on a detection threshold, the detection threshold itself being updated in dependence on the information provided by the one or more other wireless access points indicative of whether or not possible radar signals have been detected within the predetermined frequency range by the one or more other wireless access points.

14. A first wireless access point comprising:

a wireless communication interface for wireless communication with one or more user devices using one or more wireless communication channels in a predetermined frequency range, the first wireless access point being configured to communicate with one or more other wireless access points;

a radar detector operable to detect possible radar signals received by the first access point within the predetermined frequency range and being configured to provide information indicative of whether or not possible radar signals have been detected within the predetermined frequency range; and an apparatus for controlling wireless communication between the first wireless access point and the one or more user devices, the apparatus comprising:

a receiver configured to receive communications relating to information provided by the one or more other wireless access points; and a processor configured to start or stop the wireless communication with the one or more user devices using a wireless communication channel in the predetermined frequency range in dependence on information indicative of whether or not possible radar signals have been detected within the predetermined frequency range by the first wireless access point and on information provided by the one or more other wireless access points indicative of whether or not possible radar signals have been detected within the predetermined frequency range by the one or more other wireless access points, wherein the processor is configured to start or stop the wireless communication between the first wireless access point and the one or more user devices in response to detection by the first wireless access point of one or more possible radar signals within the predetermined frequency range, the wireless communication being started or stopped in dependence on a detection threshold, the detection threshold itself being updated in dependence on the information provided by the one or more other wireless access points indicative of whether or not possible radar signals have been detected within the predetermined frequency range by the one or more other wireless access points.

15. A computer program element comprising computer program code to, when loaded into a computer system and executed thereon, cause the computer system to control wireless communication between a first wireless access point and one or more user devices, the first wireless access point having a wireless communication interface for wireless communication with the one or more user devices using one or more wireless communication channels in a predetermined frequency range, the first wireless access point being configured to communicate with one or more other wireless access points, the first wireless access point and the one or more other wireless access points each having a radar detector operable to detect possible radar signals received by the access point within the predetermined frequency range and each being configured to provide information indicative of whether or not possible radar signals have been detected within the predetermined frequency range, by:

the first wireless access point receiving communications relating to information provided by the one or more other wireless access points, and starting or stopping the wireless communication with the one or more user devices using a wireless communication channel in the predetermined frequency range in dependence on information indicative of whether or not possible radar signals have been detected within the predetermined frequency range by the first wireless access point and on information provided by the one or more other wireless access points indicative of whether or not possible radar signals have been detected within the predetermined frequency range by the one or more other wireless access points, wherein the starting or stopping of the wireless communication between the first wireless access point and the one or more user devices is in response to detection by the first wireless access point of one or more possible radar signals within the predetermined frequency range, the wireless communication being started or stopped in dependence on a detection threshold, the detection threshold itself being updated in dependence on the information provided by the one or more other wireless access points indicative of whether or not possible radar signals have been detected within the predetermined frequency range by the one or more other wireless access points.

* * * * *